United States Patent
Baehr et al.

(10) Patent No.: US 7,574,296 B2
(45) Date of Patent: Aug. 11, 2009

(54) CLUTCH REFERENCE POSITION

(75) Inventors: Markus Baehr, Buehl (DE); Felix Dreher, Staufen (DE); Matthias Panzer, Karlsruhe (DE); Frank Stengel, Baden-Baden (DE); Martin Fuss, Wooster, OH (US); Jens Martin, Sinzheim-Kartung (DE); Martin Zimmermann, Sasbach (DE); Matthias Ehrlich, Buehl (DE); Alexander Schweizer, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 37 days.

(21) Appl. No.: 12/004,669

(22) Filed: Dec. 21, 2007

(65) Prior Publication Data

US 2008/0215221 A1 Sep. 4, 2008

Related U.S. Application Data

(63) Continuation of application No. PCT/DE2006/001041, filed on Jun. 20, 2006.

(30) Foreign Application Priority Data

Jun. 22, 2005 (DE) .................. 10 2005 028 844

(51) Int. Cl.
*B62D 109/00* (2006.01)

(52) U.S. Cl. ......................... 701/67; 180/293

(58) Field of Classification Search ............... 701/67
See application file for complete search history.

(56) References Cited

U.S. PATENT DOCUMENTS

| 5,678,673 | A | * | 10/1997 | Borschert et al. | .......... 192/84.6 |
| 6,099,436 | A | * | 8/2000 | Kon et al. | .......... 477/64 |
| 2002/0088681 | A1 | * | 7/2002 | Berger et al. | .......... 192/3.63 |
| 2004/0173429 | A1 | * | 9/2004 | Friedmann et al. | .......... 192/99 A |

FOREIGN PATENT DOCUMENTS

| DE | 44 33 825 A1 | 4/1996 |
| DE | 199 53 292 A1 | 12/2000 |
| DE | 100 27 330 A1 | 5/2001 |
| EP | 1 455 106 A1 | 9/2004 |

* cited by examiner

*Primary Examiner*—Thomas G Black
*Assistant Examiner*—Shelley Chen
(74) *Attorney, Agent, or Firm*—Davidson, Davidson & Kappel, LLC

(57) ABSTRACT

A process and device for the currentless referencing of a clutch position in non self-locking clutch actuating systems which are switched without current for a first predetermined, passive period of time or until an actuator standstill occurs, in order to verify a clutch reference position, then the clutch position achieved is determined by first measurement and current is supplied to the clutch actuating system for a predetermined, active period of time, the clutch actuating system being then switched again without current for another predetermined, passive period of time or until an actuator standstill occurs, the clutch position being determined by another measurement; finally the measured clutch position is checked to determine whether it can be verified as a new clutch reference position.

10 Claims, 2 Drawing Sheets

CLUTCH REFERENCE POSITION

This application is a continuation of prior International Application PCT/DE2006/001041, filed on Jun. 20, 2006, which is hereby incorporated by reference herein.

The invention relates to a method and device for controlling a non-self locking clutch.

BACKGROUND

In recent years, automated clutches have become more and more widespread. Comfort and safety are being increasingly enhanced through the use of sensor technology and electronically initiated interventions in the driving procedure.

It is known from vehicle technology to use at least one clutch actuator to actuate a clutch in an automated transmission. If absolute displacement is not used with the clutch actuator, incremental displacement measuring can be provided, which accordingly has incremental displacement measuring sensors. When so-called EC motors are used, these incremental displacement measuring sensors are integrated directly into the motors.

It has been found that the incremental displacement measuring system should be balanced regularly. When balancing the incremental displacement measuring system, a calibration point can be approached and scanned, with the position of the calibration point being used as the point of origin or clutch reference position for balancing the incremental displacement measuring system.

A control device for a motor vehicle friction clutch is proposed in DE 44 33 825 C2. This control device includes a drive, a transmission which transforms the motion of the latter into an essentially linear motion of an output element, the range of motion of the transmission in the possible direction of motion being limited by at least one stop operating in those directions, and a clutch position control. The clutch position control has a monitoring device, in which a measuring device checks the drive for energy supply and effective direction of the supplied energy, and an incremental sensor monitors changes in position of the transmission. If an inflow of energy at the drive does not result in a change of position at the incremental sensor, this proves that the stop located in the effective direction has been reached, and results in the position reached being established as the new stop position in the measuring device.

In DE 100 27 330 A1 a method for operating a torque transfer device is proposed. In so doing, it is reviewed whether a movably situated circuit element which has been under load is in a selector position that corresponds to the position of a limit stop or that corresponds to a selector position that is within a tolerance range which is situated around a target selector position. If this is the case, a low relief voltage is applied for a predetermined brief time period by the control device. The movement of the movably situated circuit element produced by this relief signal is directed in particular away from an end stop. The relief voltage at least partially overcomes self-locking forces of the electric motor or actuating mechanism or the like, so that a corresponding motion of the circuit element is produced.

SUMMARY OF THE INVENTION

An object of the present invention is to provide a method and a device with which position referencing may be possible with non-self-locking clutch actuating systems.

According to an embodiment of the invention, to verify a clutch reference position the clutch actuating system may be powered down for a defined first time period —the first passive time period—or until an actuator stoppage occurs. This passive time period may be chosen to be at least as long as a clutch-system-specific time period within which the non-self-locking clutch can travel to the stop from any position along the actuator path and under the condition that there may be no error in the clutch system, such as for example defective friction. Such a time period can preferably be estimated at 0.4 second.

The term stop is understood to mean a mechanical stop, or the position of a minimum of potential or of a zero power crossing along the actuator path which may be occupied by the non-self-locking clutch actuating system when the clutch and the clutch actuating system may be in an error-free state, i.e. for example there are no unintended resistances present, which may be caused for example by soiling. If the actuator—coming from the direction of the second stop located on the opposite side of the actuator path—moves along the actuator path toward the minimum of potential or zero power crossing, a force exists that attracts the actuator toward the position of the zero crossing. If the actuator passes the zero crossing a strong repulsive force arises, which represents the effect of a mechanical stop.

An actuator stoppage can occur if the stop is reached, or if increased friction, strain or hysteresis occurs within the clutch due to defects or misalignments. Such problems can occur with differing intensity along the clutch or actuator path, and under some circumstances may bring the actuating system to a standstill without the stop having been reached.

If the first passive time period has passed, or if an actuator stoppage occurs, the clutch position may be determined with the help of a sensor, for example an incremental displacement sensor, and may be stored for a later comparison.

The method according to the invention then provides for current to be applied to the clutch actuating system in a defined way for a defined active time period so that the actuating system and the clutch may be moved by the actuator motor if there is no collision with a stop that may have already been reached.

After the active time period has ended, the clutch actuating system may again be powered down for a defined second passive time period or until an actuator stoppage occurs. If an actuator stoppage has occurred or if the second passive time period has ended, the clutch position again may be determined in a second measurement.

If the clutch positions from the first and second measurements agree within a tolerance range of the referencing precision, and if both lie within a value range for the clutch reference position, the measured clutch position may be established as the new clutch reference position and may be considered verified. The tolerance range of the referencing precision is for example 2 increments, or is preferably less than 0.2 millimeter.

With regard to the supplying of electric power, there are may be three alternatives according to the invention. Electricity may be supplied to the clutch actuating system in particular of an EC motor in such a way that a force effect is caused in the direction of an engaged clutch. Alternatively, supplying electricity causes a force effect in the direction of a disengaged clutch. The electrical supply should advantageously be chosen so that the strength of the force may be sufficient to overcome mechanical resistances even at low temperatures or when the clutch is at an advanced age. To that end, the actuator motor may be supplied with electricity—for example by a pulse-width modulation method—at a voltage level for example below 5 volts, preferably at 2 to 3 volts, for a time period—the active time period—of less than 0.3 second, preferably for 0.1 to 0.2 second. If electricity is supplied in the direction of a disengaged clutch, it is alternatively also possible to supply electricity at a level for example of 12 volts for 10 milliseconds for example. Another alternative may be to choose the power supply so that an alternating force effect is caused by an alternating power supply, known as vibrating current. In a preferred embodiment, the vibrating current is supplied as square wave alternating current with a defined frequency of preferably 5 Hz.

Another preferred embodiment of the present invention may include the supplying of power during the active time period and the power-down during a following passive time period, as well as the subsequent execution of an additional measurement of the clutch position after the end of this passive time period or after an actuator stoppage has occurred, may be performed cyclically, in a process loop. The process loop should not be exited until the most recent measurement agrees with the stored value of the directly preceding measurement within a tolerance range of the referencing precision, and at least one of the two measured values lies within a plausible value range for the clutch reference positions. In this case the process loop may be broken off, and the most recent measured clutch position may be established as the new clutch reference position and may be regarded as verified.

The process loop may not be exited until the most recent measurement agrees with the stored value of the directly preceding measurement within a tolerance range of the referencing precision, and at least one of the two measured values lies within a plausible value range for the clutch reference positions.

Another embodiment of the present invention provides the mean value of the two measured clutch positions may be found and may be set as the clutch reference position.

Another preferred embodiment of the present invention provides that after the first passive time period has ended or when an actuator stoppage occurs and the clutch position is then determined, a check may be performed of whether the determined clutch position lies within a plausible value range for the clutch reference positions. If so, this may be adopted as the new clutch reference position and the process may be terminated.

Another preferred embodiment of the present invention provides that after the first passive time period has ended or when an actuator stoppage may occur and the clutch position may then be determined, a check may be performed of whether the deviation of the determined clutch position from the clutch reference position currently in effect lies within the tolerance range of the referencing precision. If so, the determined clutch position may be adopted as the new clutch reference position and the process may be terminated.

The method and device of the present invention provides that may be possible to find the clutch reference position for non-self-locking clutches without electricity.

BRIEF DESCRIPTION OF THE DRAWINGS

Additional advantages and advantageous embodiments of the invention are the subject of the following FIGS. and their descriptions.

The figures. show the following details.

DETAILED DESCRIPTION

Figure 1:
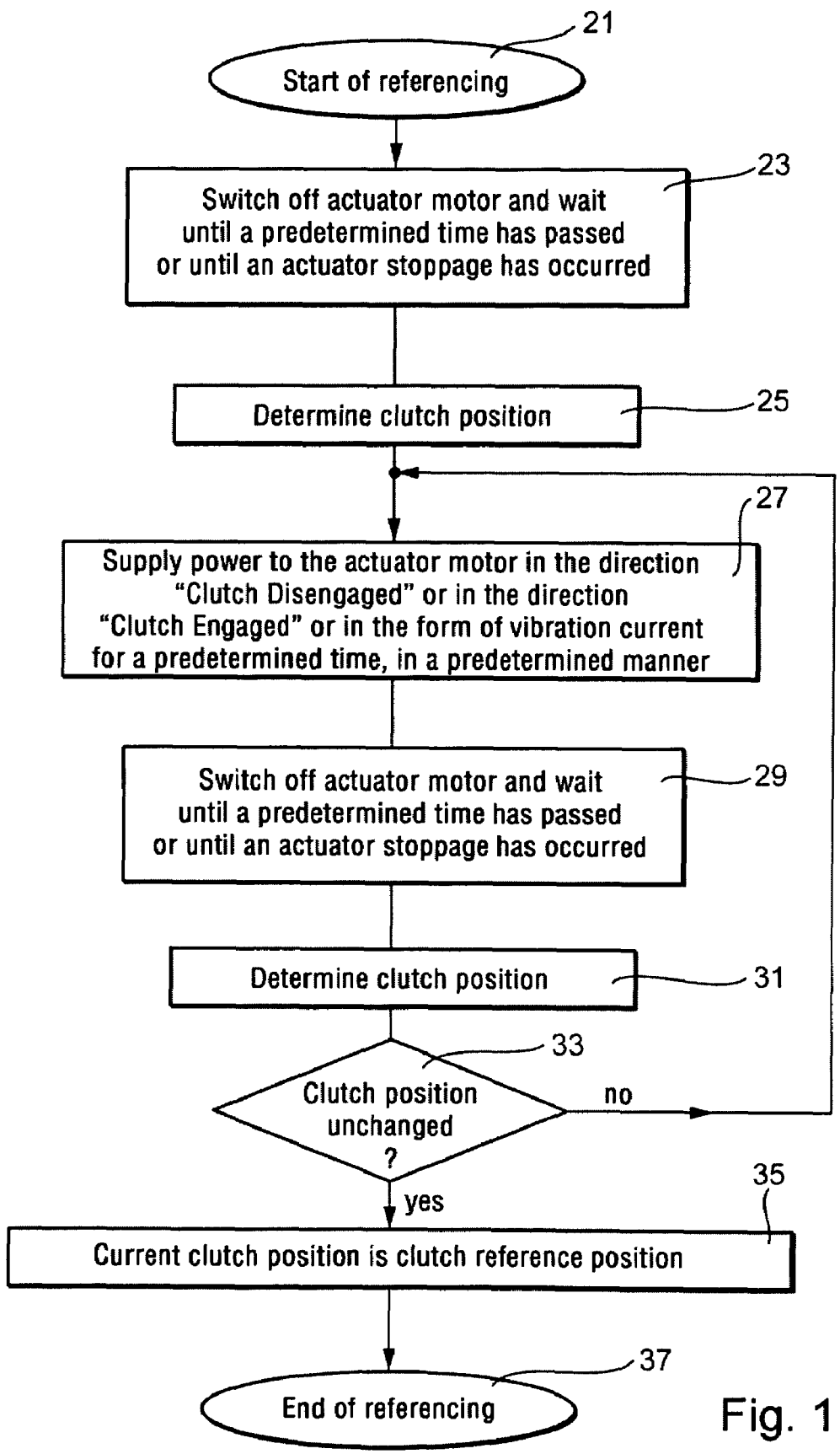
FIG. 1: A schematic depiction of the process according to the invention.

FIG. 1 schematically depicts the process in a flow diagram to illustrate the position referencing. If it is necessary to perform a referencing of the clutch position, starting from process step 21, in waiting step 23 the actuator motor is switched off, that is, it is powered down, for a defined time—the first passive time period. Thus the clutch actuating system is passive for this time period, and is moved simultaneously by the non-self-locking clutch. The clutch moves in the direction of a stop, if it is not already there and as long as there is no error present that prevents the motion, for example due to increased friction. The method is intended by preference for the independently disengaging clutch type, i.e. for clutches that are engaged under pressure and must be disengaged by force, but it is also usable for clutches that must be engaged by force. During this first passive time period the change in the clutch position is also monitored, so that a stoppage can be detected. If the end of the first passive time period has been reached, or if the clutch or the clutch actuating system comes to a stop even before the passive time period has ended, according to the process the clutch position is determined in determination step 25 and stored so that it can be recalled. Next, in electrification step 27, electricity is supplied to the actuator motor for a defined time—the active time period—so that the clutch actuating system in particular of the actuator motor is again active. According to the invention, the method provides three alternative variants for supplying electric power. One variant is the so-called vibrating power supply, in which a time-alternating force effect in the direction of clutch disengaged or engaged occurs by means of alternating voltage. The two other variants bring about a force effect in the direction of clutch disengaged or clutch engaged, respectively, during the active time period. With the help of the variants for supplying electricity, resistances caused for example by friction along the actuator path can be overcome. After the clutch actuating system has been activated in electrification step 27, according to the invention the actuating system is again switched passive in waiting step 29 by cutting off the electric power. According to the process, the same thing happens here in waiting step 29 as in waiting step 23. If the end of this passive time period has been reached, or if the clutch or the clutch actuating system comes to a stop even before the passive time period has ended, the clutch position is determined and stored again in determination step 31. This position is compared with the previously obtained clutch position in comparison step 33. If the divergence of the two positions lies within the tolerance range of the referencing precision, and if at the same time both values lie within a plausible value range for the clutch reference position, then in verification step 35 the most recently determined clutch position is established as the clutch reference position and is considered verified. If the condition in comparison step 33 is not fulfilled, the process returns to electrification step 27 and continues from there. With the verification of the clutch reference position in verification step 35, the process ends at process step 37.

Figure 2:
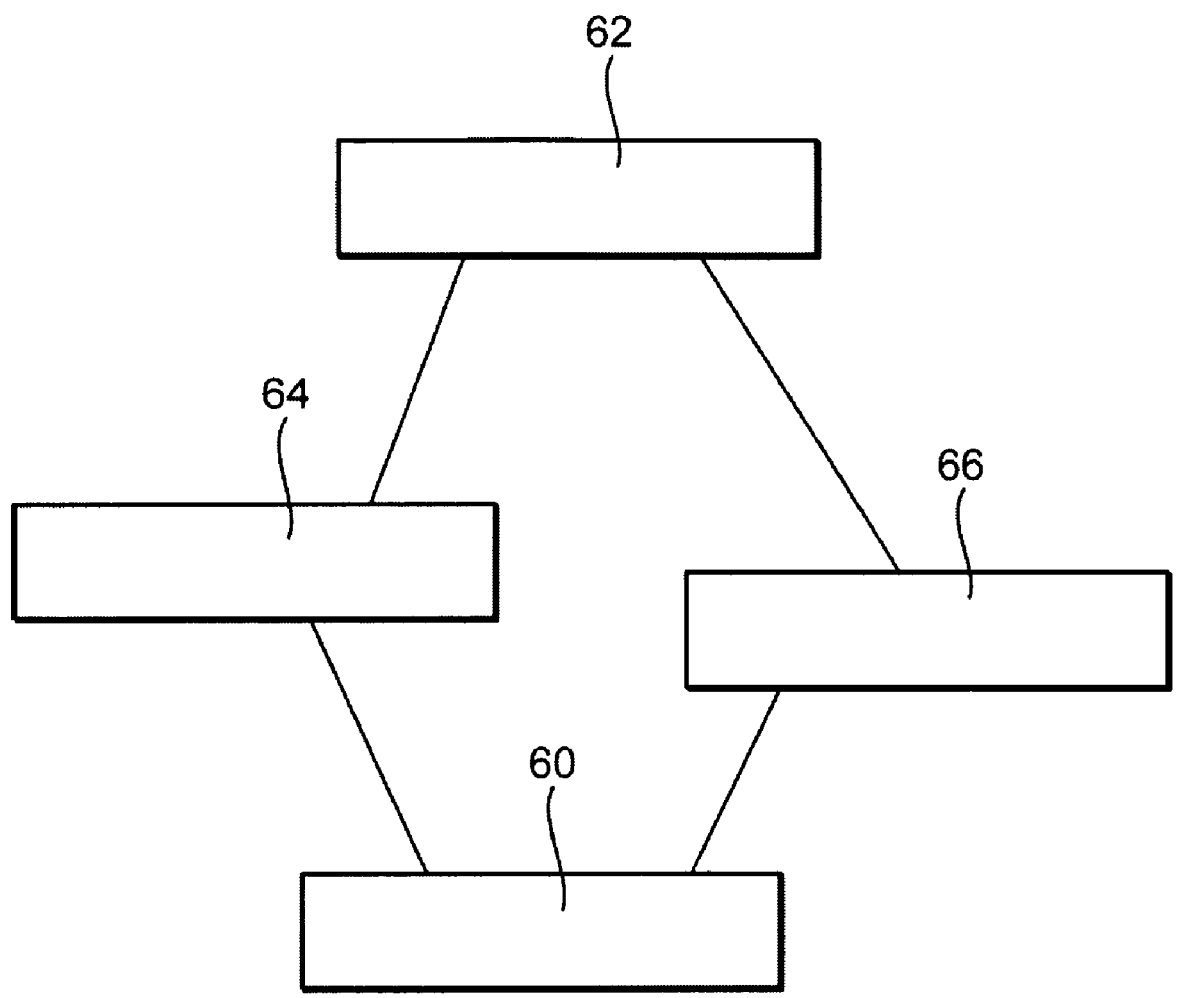
FIG. 2: A device with a schematic depiction of the interacting components.

FIG. 2 depicts the device for clutch position referencing in schematic form, as well as a schematized depiction of the interacting components. If control device 60 receives a referencing query, or if other processes in control device 60 or in another control device necessitate the performance of a clutch position referencing, control device 60 causes the actuator motor in clutch actuating system 64 to be switched to passive. Passive switching is intended to be understood as switching off the electric power to clutch actuating system 64, so that the non-self-locking clutch 62 moves in the direction of a stop if it is not yet there, and as long as no erroneous mechanical resistances hinder it from doing so. If the end of the first passive time period, during which the clutch actuating system 64 is switched to passive, has been reached, or if clutch 62 or clutch actuating system 64 comes to a stop even before the passive time period has ended, the measurement and a recallable storing of the measured clutch position are initiated by control device 60. The stoppage of the clutch is detected and the clutch position is measured with the help of a sensor 66, which in a preferred embodiment is an incremental displacement measuring sensor. Control device 60 then initiates activation of the clutch actuating system 64, in particular of the actuator motor, during the active time period. The activation is accomplished by supplying electric power to the actuator motor. In a preferred embodiment the control device causes power to be supplied in the form of vibrating current. In another preferred embodiment the control device causes power to be supplied, in such a way that a force effect in the direction of clutch engaged is brought about by clutch actuating system 64. In a third preferred embodiment power is supplied in such a way that a force effect is caused in the direction of clutch disengaged. After the active time period has ended, control device 60 causes clutch actuating system 64 to be switched to passive again until the passive time period is over, or until clutch actuating system 64 has come to a stop. This is performed by means of sensor 66 for determining the clutch position. The control device then again causes the clutch position to be determined and stored by means of sensor 66. Next, control device 60 causes this position to be compared with the clutch position that was obtained immediately before and stored so that it could be recalled. If the divergence of the two positions lies within the tolerance range of the referencing precision, and if at the same time both values lie within a plausible value range for the clutch reference position, then control device 60 sets the most recently determined clutch position as the clutch reference position and verifies it. If control device 60 determines that only one or none at all of the two conditions is fulfilled, then control device 60 causes activation of the clutch actuating system again during the active time period and subsequent passive switching of the clutch actuating system 64 during the passive time period to be carried out, as well as a determination of the clutch position. Control device 60 causes this process loop to be traversed cyclically until the two conditions are fulfilled and control device 60 causes the process to exit the loop.

REFERENCE LABELS 1 process step
23 waiting step
25 determination step
27 electrification step
29 waiting step
31 determination step
33 comparison step
35 verification step
37 process step
60 control device
62 non-self-locking clutch
64 clutch actuating system
66 sensor for determining a clutch position

What is claimed is:

1. A method for controlling a non-self-locking clutch actuatable by a clutch actuating system on the basis of electric power, between a drive unit and a transmission, and having a control device controlling the clutch actuating system and determining, using measured data of a sensor, a clutch position, the method, to verify a clutch reference position, comprising the steps of:

powering down the clutch actuating system for a predetermined first passive period of time or until an actuator stoppage occurs;

then determining the achieved clutch position in a first measurement and supplying electric power to the clutch actuating system for a predetermined active period of time;

then powering down the clutch actuating system again for another predetermined passive period of time or until another actuator stoppage occurs;

then determining the clutch position in another measurement; and then checking the measured clutch position to determine whether the clutch position measured by the first or other measurement can be verified as a new clutch reference position.

2. The method according to claim 1, wherein after the first measurement has been carried out power is supplied to the clutch actuating system cyclically for the predetermined active time period in a process loop, and the clutch actuator system is then again powered down for the remaining passive time period or until the actuator stoppage occurs, and after that the other measurement the clutch position is determined, and then the check is performed, the check including determining whether one of the measured clutch positions can be verified as the new clutch reference position and in that case the process loop is also ended; otherwise the process returns again to the beginning of the process loop and is run another time.

3. The method according to claim 2, wherein that the last, most recent measured clutch position is verified and set as the clutch reference position, if the clutch positions determined in the last measurement and in a preceding measurement agree and lie within a plausible value range for the clutch reference position.

4. The method according to claim 1, wherein for the predetermined active time period electric power is supplied to the clutch actuating system, and the clutch actuating system is then powered down again for a predetermined second passive time period or until an actuator stoppage occurs, and after that in a second measurement the clutch position is determined and then a check is performed of whether the measured clutch position can be verified as a new clutch reference position.

5. The method according to claim 4, wherein the second measured clutch position is verified and set as the clutch reference position, if the clutch positions determined in the first and second measurements agree and lie within a plausible value range for the clutch reference position.

6. The method according to claim 1, wherein that the supplying of electric power to the clutch actuating system during the active time period causes a force effect in the direction of an clutch engagement.

7. The method according to claim 1 wherein the supplying of electric power to the clutch actuating system during the active time period causes a force effect in the direction of a clutch disengagement.

8. The method according to claim 1 wherein the supplying of electric power to the clutch actuating system during the active time period causes a force effect that alternates over time.

9. The method according to claim 1 wherein the clutch actuating system is supplied with electric power only at voltage or current levels that will not result in thermal overloading of the actuator motors.

10. A device for controlling a non-self-locking clutch actuatable by a clutch actuating system on the basis of electric power, between a drive unit and a transmission, comprising:

a controller controlling the clutch actuating system and using measured data of a sensor to determine a clutch position, the controller capable of carrying out the method according to claim 1.

* * * * *